United States Patent [19]

Carlberg

[11] Patent Number: 5,565,514
[45] Date of Patent: Oct. 15, 1996

[54] FIBER ADDITIVES FOR REINFORCING PLASTIC MATRICES

[75] Inventor: James R. Carlberg, Peoria, Ill.

[73] Assignee: Caterpillar Inc., Peoria, Ill.

[21] Appl. No.: 419,864

[22] Filed: Apr. 11, 1995

[51] Int. Cl.⁶ .................... C08K 3/40; C08K 77/10; B32B 5/02
[52] U.S. Cl. .................... 524/494; 524/495; 524/496; 524/442; 523/214; 428/268; 264/257
[58] Field of Search .................... 524/494, 495, 524/496, 442; 523/214; 428/268, 902; 264/257

[56] References Cited

U.S. PATENT DOCUMENTS

| | | | |
|---|---|---|---|
| 4,908,402 | 3/1990 | Sasaki et al. | 524/495 |
| 4,943,404 | 7/1990 | Waldrop | 264/278 |
| 5,039,572 | 8/1991 | Bobsein et al. | 428/408 |
| 5,098,940 | 3/1992 | Brooks | 524/420 |
| 5,153,250 | 10/1992 | Sinclair | 524/451 |
| 5,223,564 | 6/1993 | Nakio | 523/214 |
| 5,286,784 | 2/1994 | Inoue et al. | 524/425 |
| 5,292,805 | 3/1994 | Paschke et al. | 524/451 |
| 5,316,834 | 5/1994 | Matsuda et al. | 428/233 |
| 5,334,647 | 8/1994 | Sperk, Jr. et al. | 524/507 |
| 5,362,431 | 11/1994 | Guerrini et al. | 264/131 |
| 5,387,645 | 2/1995 | Montag et al. | 525/66 |
| 5,436,294 | 7/1995 | Desio et al. | 525/66 |

*Primary Examiner*—Paul R. Michl
*Assistant Examiner*—Olga Asinovsky
*Attorney, Agent, or Firm*—Pankaj M. Khosla

[57] ABSTRACT

A reinforced plastic composition that possesses excellent wear resistance and weld line strength without a significant increase in the flexural modulus. The reinforced plastic composition for forming molded and extruded products has a plastic matrix with a plurality of fibers dispersed therein. The fibers are present in the range of about 1% to about 30% by weight of the plastic matrix. The reinforced plastic composition has a weld line strength greater than 66% of the weld line strength of the plastic matrix without the fibers. The plastic composition is particularly useful for making thrust washers, pump seals, piston rings and other dynamic bearing and sealing components for engines, transmissions and drivelines.

22 Claims, 3 Drawing Sheets

5,565,514

FIBER ADDITIVES FOR REINFORCING PLASTIC MATRICES

TECHNICAL FIELD

The present invention relates generally, to the use of fiber additives in a plastic matrix to improve its durability and more particularly, to the use of carbon and ceramic fiber additives in a thermoplastic matrix for forming bearing and sealing materials having superior weld line strength and wear resistance while still retaining low flexural modulus.

BACKGROUND ART

There has been a need for high performance reinforced plastic composites, such composites having a unique combination of reinforcement materials incorporated into a virgin plastic material, and such composites further having enhanced performance capabilities from a standpoint of durability and longevity, when exposed to wear mechanisms encountered in a typical tribological environment.

An engine driveline is one example of a tribological environment. In an engine driveline, and particularly in the design of a final drive in such a driveline, the use of plastic components for dynamic sealing and bearing applications is well known. In this environment i.e., where a sealing or bearing interface is involved, the plastic component is exposed to friction, pressure, high temperature and lubricants. One example of such a dynamic plastic component is a thrust washer, which is constantly subjected to a combination of varying levels of speed and load at high temperatures. Typically, a multiple of pressure and relative velocity (P*V) is a measure of how rigorous and demanding the application is. For example, a P*V value can range from as low as 50,000 to as high as 1,250,000, the pressure being measured in pounds/inch$^2$ (psi) and the velocity being measured in feet/minute (fpm). Applications having a P*V greater than 150,000 are generally considered to be very demanding.

When a thrust washer is used in a dynamic sealing and bearing application, it eventually fails either due to excessive wear at a given P*V, or high thermal stresses due to poor heat dissipation i.e., "hot spotting", or sometimes a combination of both. Thus it is very desirable that the thrust washer have high wear resistance at a given P*V so that it performs as a bearing, that it have good heat dissipation properties to withstand thermal stresses and also, that it have good flexibility to provide toughness and perform as a seal. The thrust washers are typically made from plastics such as polyethersulphone (PES), polyamides (PA), polyetherketone (PEK) and polyphenylenesulphides (PPS), to name a few. These plastics are usually reinforced either with glass fibers, such as 40% glass filled PPS and in some cases, with carbon fibers.

It is well known in the art that the addition of one type of a reinforcing fiber in a plastic material increases the wear resistance of the plastic composite but consequently also increases the stiffness of the plastic composite. Because plastic parts such as thrust washers are generally injection molded, weld line strength of the molded part is also very significant. An increase in the wear resistance of an injection molded article made from a fiber reinforced plastic composite, is usually accompanied by a significant decrease in the weld line strength of that article, as compared to the virgin, or unfilled plastic. Poor weld line strength results in premature failure of a dynamic plastic component such as a thrust washer, when used in a demanding application.

U.S. Pat. No. 4,908,402 issued to Sasaki et al. on Mar. 13, 1990, describes a resin composition comprising polyglutarimide resin and carbon fibers incorporated therein. Although Sasaki et al. describe a plastic composite with carbon fibers having good heat resistance, wear resistance and thermal conductivity, they do not contemplate a wear additive package which is a unique combination of a plurality of fibers that preferably optimizes the desired properties such as high wear resistance and high weld line strength at a lower flexural modulus.

Besides thrust washers, there are other engine parts that are also exposed to tribological wear mechanisms. Piston rings made from plastic composites are constantly subjected to a harsh environment due to elevated temperatures encountered in the combustion chamber, as well as frictional wear and lubricants. Pump seals made from plastic composites perform the dual function of a seal and a bearing and thus require a combination of high wear resistance and weld line strength without a significantly high flexural modulus.

It is desirable to have a reinforced plastic composition that has excellent wear resistance and weld line strength properties without a significant increase in the flexural modulus. It is further desirable to have a fiber additive package that may be incorporated into different types of plastics to result in composite that has a combination of the above properties at a reasonable cost.

Heretofore, there has been no known plastic composition reinforced with a fiber additive package that results in a unique combination of the above desirable properties. There has also been no known plastic composition that exploits the heretofore unknown synergism between a combination of carbon and ceramic fibers, and ceramic and glass fibers, in a manner that results in an optimum combination of the above desired properties. The present invention is directed to overcome one or more of the problems as set forth above.

DISCLOSURE OF THE INVENTION

In one aspect of the present invention, a reinforced plastic composition for forming molded and extruded products has a plastic matrix selected from a group consisting of polyphthalamide, polyethersulphone, polyphenylenesulphide, polyetherketone, and polyetheretherketone. The reinforced plastic composition has a plurality of fibers dispersed within the plastic matrix. The fibers are present in the range of about 1% to about 30% by weight of the plastic matrix. The reinforced plastic composition has a weld line strength greater than 66% of the weld line strength of the plastic matrix without the fibers.

In another aspect of the present invention, a reinforced plastic composition for forming molded and extruded products has a polyphthalamide thermoplastic matrix. The reinforced plastic composition has a plurality of fibers dispersed within the thermoplastic matrix. The fibers are present in the range of about 1% to about 30% by weight of the thermoplastic matrix. The reinforced plastic composition has a weld line strength greater than 66% of the weld line strength of the thermoplastic matrix without the fibers.

In yet another aspect of the present invention, an injection molded article is formed from a reinforced plastic composition. The composition has a polyphthalamide thermoplastic matrix and a plurality of fibers dispersed within the thermoplastic matrix. The fibers are present in the range of about 1% to about 30% by weight of the thermoplastic matrix. The reinforced plastic composition has a weld line strength greater than 66% of the weld line strength of the thermoplastic matrix without the fibers.

BEST MODE FOR CARRYING OUT THE INVENTION

Figure 1:
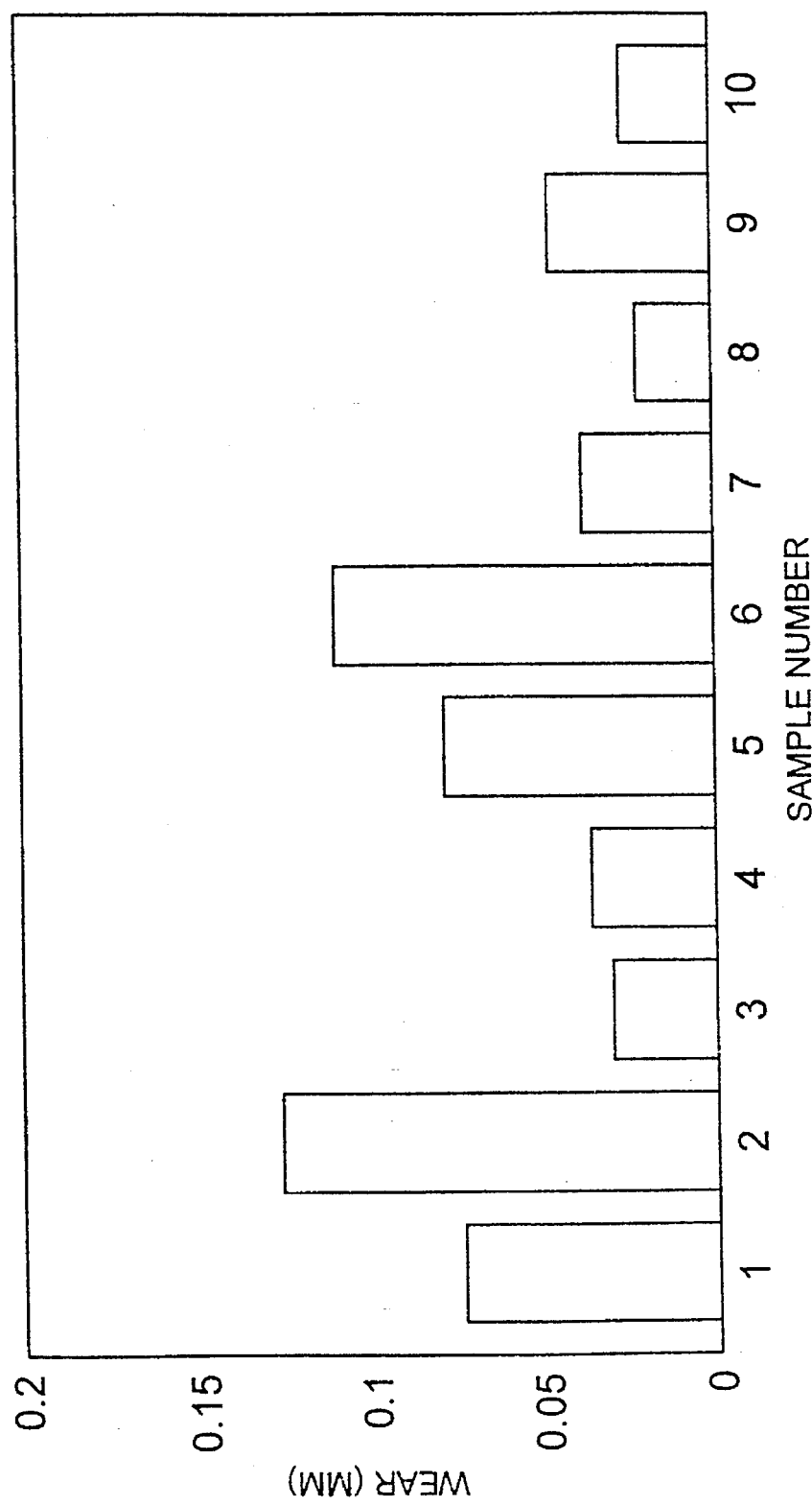
FIG. 1 is a graph illustrating the improved wear characteristics of Samples 7–8 and Samples 9–10, which represent polyphthalamide reinforced with a combination of carbon and ceramic fibers, and a combination of ceramic and glass fibers respectively, according to the present invention, over Samples 1–6, which represent polyphthalamide reinforced individually with carbon fibers, or ceramic fibers or glass fibers.

In the preferred embodiment of the present invention, a fiber additive package comprising a plurality of fibers, is incorporated into a polyphthalamide thermoplastic matrix, resulting in a reinforced polyphthalamide composite material. Other examples of plastics into which a fiber additive package may be incorporated into, based on the desired end application and physical properties, are polyethersulphone, polyphenylenesulphide, polyamideimide, polyetherketone, and polyetheretherketone.

The plastic material used in carrying out the preferred embodiment of the present invention is polyphthalamide having a trade name "AMODEL A-200", is manufactured by Amoco, and is an unfilled, medium viscosity polymer.

By the use of the term "fiber additive package", it is meant that the reinforcing fibers are a synergistic combination of relative amounts of different types of fibers, incorporated into the plastic matrix at a specific plastic to fiber ratio, to impart the resultant reinforced plastic composite, an optimum combination of desirable properties such as wear resistance and weld line strength without a significant increase in flexural modulus.

By the use of the term "lubricant package", it is meant that certain lubricants, particularly polytetrafluoroethylene (PTFE) and graphite, are added to the plastic matrix to impart the required amount of lubricity to the plastic. In the various embodiments of the present invention, the lubricant package comprises of 10% PTFE and 5% graphite, by weight, of the reinforced plastic composite.

In the preferred embodiment of the present invention, the fiber additive package is present in the plastic matrix desirably, in the range of about 1% to about 30%, and preferably, about 12% by weight of the unfilled plastic matrix. A fiber level less than 1% is undesirable because, the amount of reinforcing effect would be minimal. A fiber level greater than 30% is undesirable because the flow processability and the molding processability of the plastic composite are reduced and the desirable incremental improvement in wear resistance is eclipsed by the detrimental reduction in the weld line strength to less than 66% of the weld line strength of the unfilled plastic matrix, as well as a detrimental increase in the flexural modulus.

In the preferred embodiment of the present invention, the fiber additive package is a combination of carbon and ceramic fibers. In another embodiment of the present invention, the fiber additive package is a combination of ceramic and glass fibers. In yet another embodiment of the present invention, the fiber additive package may have a combination of carbon, ceramic, and glass fibers, and mixtures thereof.

In the preferred embodiment of the present invention, the carbon and ceramic fibers are present in a weight ratio desirably in the range of about 25:75 of carbon fibers to ceramic fibers, and preferably, about 50:50. A weight ratio less than 25:75 carbon to ceramic fibers is undesirable because the wear resistance, weld line strength and thermal conductivity of the composite would be detrimentally reduced. A weight ratio greater than 75:25 carbon to ceramic fibers is undesirable because the stiffness of the plastic composite would detrimentally increase and the weld line strength would decrease. A weight ratio of 50:50 carbon to ceramic fibers is preferable because it represents the best synergism between the reinforcing effects of carbon fiber and ceramic fiber individually.

In another embodiment, the ceramic and glass fibers are present in a weight ratio desirably in the range of about 25:75 of ceramic fibers to glass fibers, and preferably, about 50:50. A weight ratio less than 25:75 ceramic to glass fibers is undesirable because the wear resistance and weld line strength of the composite would be detrimentally reduced. A weight ratio greater than 75:25 ceramic to glass fibers is undesirable because the stiffness of the plastic composite would detrimentally increase. A weight ratio of 50:50 carbon to ceramic fibers is preferable because it represents the best synergism between the reinforcing effects of carbon fiber and ceramic fiber individually.

In the preferred embodiment of the present invention, the carbon fibers have desirably, a length in the range of about 30 µm to about 300 µm, a diameter in the range of about 5 µm to about 20 µm, and a length to diameter ratio in the range of about 10 to about 30. More desirably, the carbon fibers have a length of about 200 µm and a diameter of about 10 µm. Preferably, the carbon fibers have a length of about 60 µm and a diameter of about 3 µm. The carbon fibers used in carrying out the preferred embodiment have a trade name "S-2415", are manufactured by Osaka Gas, and have an average fiber length of 200 µm, a mean diameter of 10 µm, and a mean L/D ratio of about 20.

In the preferred embodiment of the present invention, the ceramic fibers have desirably, a length in the range of about 50 µm to about 250 µm, a diameter in the range of about 10 µm to about 40 µm, and a length to diameter ratio in the range of about 3 to 10. Preferably, the ceramic fibers have a length of about 150 µm and a diameter of about 25 µm. The ceramic fibers used in carrying out the preferred embodiment have a trade name "Fiberfrax EF-119", are manufactured by Carborundum Co., and have an average fiber length of 140 µm, a mean diameter of 25 µm, and a mean L/D ratio of about 6.

In an embodiment of the present invention, the glass fibers have desirably, a length in the range of about 500 µm to about 2500 µm, a diameter in the range of about 50 µm to about 200 µm, and a length to diameter ratio in the range of about 10 to about 20. Preferably, the glass fibers have a length of about 1500 µm and a diameter of about 100 µm. The glass fibers used in carrying out the embodiments have a trade name "Fiberglas 737 BD", are manufactured by Owens Corning Fiber Glass Corp., and have an average fiber length (L) of 1500 µm, a mean diameter (D) of 100 µm, and a mean L/D ratio of about 15.

In the preferred embodiment of the present invention, the carbon and ceramic fiber additives reinforced polyphthalamide plastic composite has the following composition, by weight percent:

| | |
|---|---|
| Polypthalamide resin | 75.0 |
| PTFE | 10.0 |
| Graphite | 5.0 |
| Carbon fibers | 5.0 |
| Ceramic fibers | 5.0 |

Further, as shown by the following Examples A, B and C, the reinforced plastic composition embodying the present invention has dramatically improved wear resistance and weld line strength without a significant increase in the stiffness.

The wear characteristics of the various samples in the Examples described below were determined by the Variable Load Wear Test, which has been developed by Caterpillar Inc. This test was conducted according to a procedure which includes the following steps:

1. Test samples are injection molded from a preselected composition, each test sample being shaped like a flat annular disk having an inside diameter of 42 mm, an outside diameter of 60 mm and a thickness of 3 mm, and further having three radially oriented oil grooves of about 0.38 mm depth and spaced 120 degrees apart and extending from the inner to the outer diameter, on each planar surface of the annular disk.
2. The test sample is rigidly attached to a circular steel backing plate and mounted on a spindle capable of rotation at varying speeds.
3. A layer of SAE grade 30W oil is applied to the test sample surface.
4. The test sample is brought into contact concentrically with a steel annular wear plate having an inside diameter of 52.7 mm, an outside diameter of 76.2 mm, a surface hardness of Rockwell C 40, and a surface roughness (Ra) of 0.8 μm (32 μin), such that the resultant contact area between the test sample and the wear plate is 1 in$^2$.
5. The annular wear plate is mounted in a non-rotating fixture which is capable of movement in a direction towards the test sample.
6. A 173 lb. load is applied to the fixture, thereby compressing the test sample to the wear plate.
7. The test sample is lubricated with SAE 30W transmission oil circulating at a rate of about 8.14 liters/hour (0.035 gpm), which represents a starved lubrication environment.
8. The spindle is then rotated at 1070 fpm while maintaining the 173 lb. load on the test sample for a period of 100 hours, representing a P*V of about 185,000 psi*fpm.
9. After 100 hours, the test sample is removed and its thickness is measured by using a dial indicator.

The amount of wear is calculated as follows;

$$\text{Amount wear} = t_i - t_f$$

where $t_i$ is the initial thickness and $t_f$ is the final thickness of the test sample.

The weld line strength of the various samples in the Examples described below were determined by the Weld Line Flexural Strength Test, which has been developed by Caterpillar Inc. The test machine for conducting this test conforms to the test machine described in ASTM D790, "Test for Flexural Properties of Plastics". This test measures the flexural strength of an injection molded fiber reinforced plastic part in the shape of a flat annular disk across the weld line, and the flexural strength of a similar shaped injection molded non-reinforced plastic part across a line 60 degrees to the weld line. This test was conducted according to a procedure which includes the following steps:

1. A test sample, having a selected composition and shaped like a flat annular disk having an inside diameter of 42 mm, an outside diameter of 60 mm and a thickness of 3 mm, is injection molded.
2. The test sample is rigidly attached in the test machine at the weld line, or 60 degrees to the weld line.
3. The rate of travel of the crosshead is set at 12.7 mm/minute.
4. The load applicator is positioned in the range of about 9.5 mm to about 10.5 mm from the center of the test sample and parallel to the front of the specimen holder.
5. The load is applied to the test sample at a crosshead speed of about 12.7 mm/minute.
6. The maximum load applied to the test sample when the test sample breaks is recorded.

The % weld strength retention as compared to the parent weld strength is calculated as follows;

$$\% \text{ weld strength retention} = \frac{L_f}{L_{uf}} \times 100$$

where $L_{uf}$ is the load at break for a sample made from a non-reinforced plastic, and $L_f$ is the load at break for a sample made from a fiber reinforced plastic.

The flexural modulus of the various samples in the Examples described below were measured according to ASTM D790, "Test for Flexural Properties of Plastics".

In the following Example A, samples 1 and 2 represent a reinforced polypthalamide composite with a lubricant package, respectively having about 10% and 20% by weight carbon fibers. Samples 3 and 4 represent a reinforced polypthalamide composite with a lubricant package, respectively having about 10% and 20% by weight ceramic fibers. Samples 5 and 6 represent a reinforced polypthalamide composite with a lubricant package, respectively having about 10% and 20% by weight glass fibers. These single fiber reinforced plastic composite samples are compared below in Examples B and C, with samples 7–8 and samples 9–10 respectively.

In the following Example B, samples 7 and 8 represent a reinforced polypthalamide composite with a lubricant package, respectively having fiber additive packages comprising a mixture of about 5% carbon and 5% ceramic fibers, and about 10% carbon and 10% ceramic fibers, by weight.

In the following Example C, samples 9 and 10 represent a reinforced polypthalamide composite with a lubricant package, respectively having fiber additive packages comprising a mixture of about 5% ceramic and 5% glass fibers, and about 10% ceramic and 10% glass fibers, by weight.

All test sample compositions were mixed in a conventional manner in a co-rotating twin screw extruder equipped with a V blender. The compositions can also be mixed in a counter-rotating twin screw extruder. Such equipment is well known in the art. The extruder parameters such as temperature and rotational speed can be set by one skilled in the art, depending on the type of plastic being used.

EXAMPLE A

Samples 1–6 were prepared according to the following compositions, by weight percent:

TABLE I

| Sample No. | Component | Weight % |
| --- | --- | --- |
| 1 | Polyphthalamide | 75 |
|   | PTFE | 10 |
|   | Graphite | 5 |
|   | Carbon fibers | 10 |
| 2 | Polyphthalamide | 65 |
|   | PTFE | 10 |
|   | Graphite | 5 |
|   | Carbon fibers | 20 |
| 3 | Polyphthalamide | 75 |
|   | PTFE | 10 |
|   | Graphite | 5 |
|   | Ceramic fibers | 10 |
| 4 | Polyphthalamide | 65 |
|   | PTFE | 10 |
|   | Graphite | 5 |
|   | Ceramic fibers | 20 |
| 5 | Polyphthalamide | 75 |
|   | PTFE | 10 |
|   | Graphite | 5 |
|   | Glass fibers | 10 |
| 6 | Polyphthalamide | 65 |
|   | PTFE | 10 |
|   | Graphite | 5 |
|   | Glass fibers | 20 |

Samples 1–6 were tested in accordance with the previously identified standardized test procedures. The results of the physical property tests are shown in Table II.

TABLE II

| Sample No. | Wear Loss (mm) | Weld Line Strength (%) | Flexural Modulus (psi) |
| --- | --- | --- | --- |
| 1 | 0.073 | 93.5 | 726,844 |
| 2 | 0.126 | 68.4 | 993,247 |
| 3 | 0.030 | 80.9 | 644,040 |
| 4 | 0.036 | 74.1 | 843,211 |
| 5 | 0.078 | 85.4 | 725,864 |
| 6 | 0.110 | 80.3 | 932,211 |

EXAMPLE B

Samples 7 and 8 were prepared according to the following compositions, by weight percent:

TABLE III

| Sample No. | Component | Weight % |
| --- | --- | --- |
| 7 | Polyphthalamide | 75 |
|   | PTFE | 10 |
|   | Graphite | 5 |
|   | Carbon fibers | 5 |
|   | Ceramic fibers | 5 |
| 8 | Polyphthalamide | 65 |
|   | PTFE | 10 |
|   | Graphite | 5 |
|   | Carbon fibers | 10 |
|   | Ceramic fibers | 10 |

Samples 7 and 8 were tested in accordance with the previously identified standardized test procedures. The results of the physical property tests are shown in Table IV.

TABLE IV

| Sample No. | Wear Loss (mm) | Weld Line Strength (%) | Flexural Modulus (psi) |
| --- | --- | --- | --- |
| 7 | 0.038 | 96.9 | 696,865 |
| 8 | 0.022 | 86.8 | 902,259 |

EXAMPLE C

Samples 9 and 10 were prepared according to the following compositions, by weight percent:

TABLE V

| Sample No. | Component | Weight % |
| --- | --- | --- |
| 9 | Polyphthalamide | 75 |
|   | PTFE | 10 |
|   | Graphite | 5 |
|   | Ceramic fibers | 5 |
|   | Glass fibers | 5 |
| 10 | Polyphthalamide | 65 |
|    | PTFE | 10 |
|    | Graphite | 5 |
|    | Ceramic fibers | 10 |
|    | Glass fibers | 10 |

Samples 9 and 10 were tested in accordance with the previously identified standardized test procedures. The results of the physical property tests are shown in Table VI.

TABLE VI

| Sample No. | Wear Loss (mm) | Weld Line Strength (%) | Flexural Modulus (psi) |
| --- | --- | --- | --- |
| 9 | 0.047 | 107.5 | 548,472 |
| 10 | 0.026 | 97.5 | 656,190 |

Figure 2:
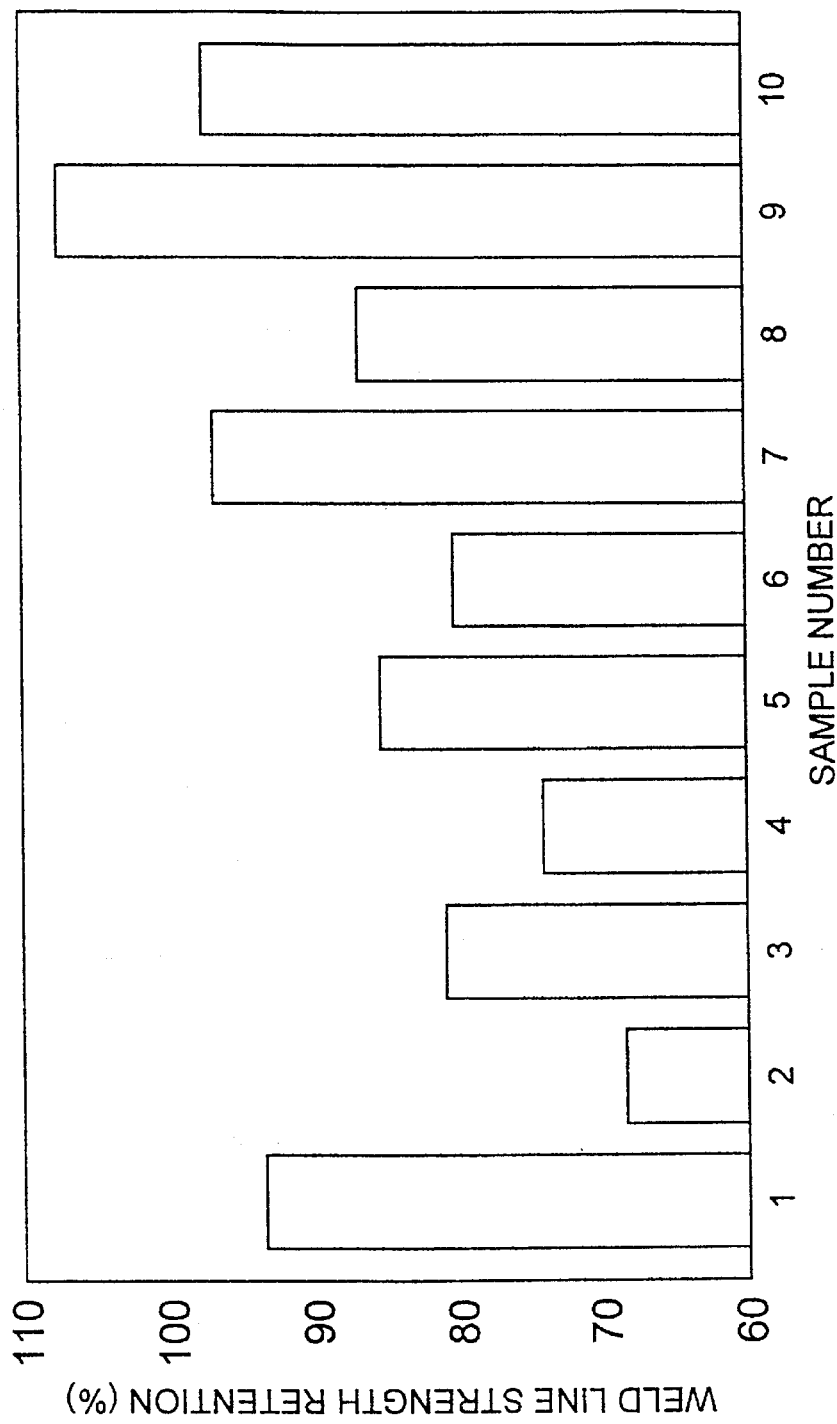
FIG. 2 is a graph illustrating the improved weld line strength of Samples 7–8 and Samples 9–10, according to the present invention, over Samples 1–6; and, FIG. 3 is a graph illustrating the lower flexural modulus of Samples 7–8 and Samples 9–10, according to the present invention, over Samples 1–6, when compared at similar overall levels of fiber content in polyphthalamide.
Figure 3:
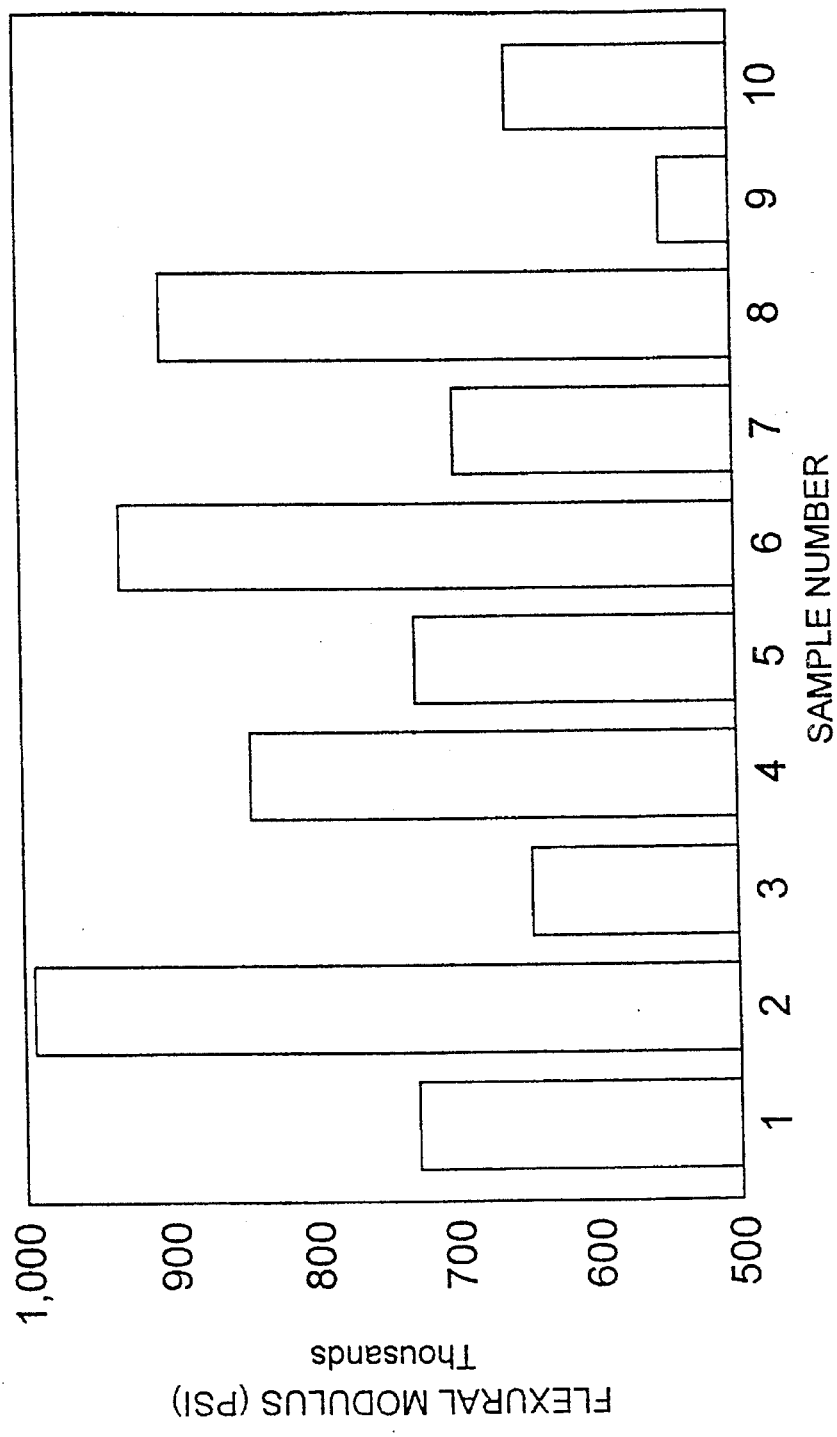

The graphical representation of the data in Tables II, IV, and VI in FIG. 1, FIG. 2 and FIG. 3. FIG. 1 illustrates the improved wear resistance of sample 7 over sample 1, of sample 8 over samples 2 and 4, of sample 9 over sample 5, and of sample 10 over samples 4 and 6. FIG. 2 illustrates the improved weld line strength retention of sample 7 over samples 1 and 3, of sample 8 over samples 2 and 4, of sample 9 over samples 3 and 5, and of sample 10 over samples 4 and 6. FIG. 3 illustrates the lower flexural modulus of sample 7 over sample 1, of sample 8 over sample 2, of sample 9 over samples 3 and 5, and of sample 10 over samples 4 and 6.

It can be seen that there exists a unique and unexpected synergism in the combination of carbon and ceramic fibers, as compared to carbon or ceramic fibers alone. Particularly, a fiber additive package having a combination of 5% carbon and 5% ceramic fibers (sample 7) results in better properties than reinforcement with 10% carbon fibers (sample 1) or 10% ceramic fibers (sample 3). Sample 7 exhibits a higher weld line strength retention of 97%, as compared to sample 1 (93.5%) and sample 3 (81%). Further sample 7 exhibits a very low wear of 0.038 mm, as compared to sample 1 (0.075 mm) and not significantly higher wear than sample 3 (0.035 mm). Still further, sample 7 has a flexural modulus of 700,000 psi, which is quite comparable to that of sample 1 (725,000 psi) and sample 3 (645,000 psi).

Industrial Applicability

The fiber-reinforced plastic composition of the present invention is useful for making high performance plastic components in applications where a sealing or bearing interface is involved and where the plastic component is exposed to friction, pressure, high temperature and lubricants. Thus, the fiber-reinforced plastic composition is particularly useful for making thrust washers, pump seals, piston rings and other dynamic bearing and sealing components for engines and transmissions.

The plastic composition of this invention can be useful in a variety of applications where a combination of wear resistance and weld line strength is desirable without a significant increase in the flexural modulus.

Other aspects, features and advantages of the present invention can be attained from a study of the drawings, the disclosure and the appended claims.

I claim:

1. A reinforced plastic composition for forming molded and extruded products, comprising:

a plastic matrix, said plastic matrix being selected from a group consisting of polyphthalamide, polyethersulphone, polyphenylenesulphide, polyetherketone, and polyetheretherketone; and a combination of fibers dispersed within said plastic matrix, said fiber combination being one of carbon-ceramic fibers and ceramic-glass fibers, said fiber combination being present in the range of about 1% to about 30% by weight of said plastic matrix; and said carbon and ceramic fibers in said carbon-ceramic fiber combination, and said ceramic and glass fibers in said ceramic-glass fiber combination being respectively present in a weight ratio in the range of about 1:3 to about 3:1 with respect to each other; and said plastic matrix reinforced with said fiber combination having at least a 10% greater wear resistance, and a 10% greater weld line strength retention and no greater than 10% increase in flexural modulus than the corresponding wear resistance and weld line strength retention and flexural modulus respectively, of a plastic matrix reinforced with one of carbon fibers, ceramic fibers and glass fibers, when compared at a same total fiber weight % loading in said plastic matrix, and said reinforced plastic composition having a weld line strength of at least 75% of a weld line strength of said plastic matrix.

2. A reinforced plastic composition, as set forth in claim 1, wherein said fiber combination is a mixture of carbon fibers and ceramic fibers.

3. A reinforced plastic composition, as set forth in claim 2, wherein said carbon and ceramic fibers are present in a weight ratio in the range of about 1.5:2.5 to about 2.5:1.5 of carbon fibers to ceramic fibers.

4. A reinforced plastic composition, as set forth in claim 3, wherein said carbon and ceramic fibers are present in a weight ratio of about 1:1.

5. A reinforced plastic composition, as set forth in claim 1, wherein said carbon fibers have a length in the range of about 30 μm to about 300 μm, a diameter in the range of about 5 μm to about 20 μm, and a length to diameter ratio in the range of about 10 to about 30.

6. A reinforced plastic composition, as set forth in claim 5, wherein said carbon fibers have a length of about 200 μm and a diameter of about 10 μm.

7. A reinforced plastic composition, as set forth in claim 6, wherein said carbon fibers have a length of about 60 μm and a diameter of about 3 μm.

8. A reinforced plastic composition, as set forth in claim 1, wherein said ceramic fibers have a length in the range of about 50 μm to about 250 μm, a diameter in the range of about 10 μm to about 40 μm, and a length to diameter ratio in the range of about 3 to about 10.

9. A reinforced plastic composition, as set forth in claim 8, wherein said ceramic fibers have a length of about 150 μm and a diameter of 25 μm.

10. A reinforced plastic composition, as set forth in claim 1, wherein said glass fibers have a length in the range of about 500 μm to about 2500 μm, a diameter in the range of about 50 μm to about 200 μm, and a length to diameter ratio in the range of about 10 to about 20.

11. A reinforced plastic composition, as set forth in claim 10, wherein said glass fibers have a length of about 1500 μm and a diameter of 100 μm.

12. A reinforced plastic composition for forming molded and extruded products, comprising:

a polyphthalamide thermoplastic matrix; and a combination of fibers dispersed within said thermoplastic matrix, said fiber combination being one of carbon-ceramic fibers and ceramic-glass fibers, said fiber combination being present in the range of about 1% to about 30% by weight of said thermoplastic matrix; and said carbon and ceramic fibers in said carbon-ceramic fiber combination, and said ceramic and glass fibers in said ceramic-glass fiber combination being respectively present in a weight ratio in the range of about 1:3 to about 3:1 with respect to each other; and said thermoplastic matrix reinforced with said fiber combination having at least a 10% greater wear resistance, and a 10% greater weld line strength retention and no greater than 10% increase in flexural modulus than the corresponding wear resistance and weld line strength retention and flexural modulus respectively, of a thermoplastic matrix reinforced with one of carbon fibers, ceramic fibers and glass fibers, when compared at a same total fiber weight % loading in said thermoplastic matrix, and said reinforced plastic composition having a weld line strength of at least 75% of a weld line strength of said thermoplastic matrix.

13. A reinforced plastic composition, as set forth in claim 12, wherein said fiber combination is a mixture of carbon fibers and ceramic fibers.

14. A reinforced plastic composition, as set forth in claim 12, wherein said fiber combination is a mixture of ceramic fibers and glass fibers.

15. A reinforced plastic composition, as set forth in claim 13, wherein said carbon and ceramic fibers are present in a weight ratio in the range of about 1.5:2.5 to about 2.5:1.5 of carbon fibers to ceramic fibers.

16. A reinforced plastic composition, as set forth in claim 14, wherein said ceramic and glass fibers are present in a weight ratio in the range of about 1.5:2.5 to about 2.5:1.5 of ceramic fibers to glass fibers.

17. A reinforced plastic composition, as set forth in claim 12, wherein said carbon fibers have a length in the range of about 30 μm to about 300 μm, a diameter in the range of about 5 μm to about 20 μm, and a length to diameter ratio in the range of about 10 to about 30.

18. A reinforced plastic composition, as set forth in claim 12, wherein said ceramic fibers have a length in the range of about 50 μm to about 250 μm, a diameter in the range of about 10 μm to about 40 μm, and a length to diameter ratio in the range of about 3 to about 10.

19. A reinforced plastic composition, as set forth in claim 12, wherein said glass fibers have a length in the range of about 500 μm to about 2500 μm, a diameter in the range of about 50 μm to about 200 μm, and a length to diameter ratio in the range of about 10 to about 20.

20. An injection molded article formed from a reinforced plastic composition, said composition comprising:

a polyphthalamide thermoplastic matrix; and a combination of fibers dispersed within said thermoplastic matrix, said fiber combination being one of carbon-ceramic fibers and ceramic-glass fibers, said fiber combination being present in the range of about 1% to about 30% by weight of said thermoplastic matrix; and said carbon and ceramic fibers in said carbon-ceramic fiber combination, and said ceramic and glass fibers in said ceramic-glass fiber combination being respectively present in a weight ratio in the range of about 1:3 to about 3:1 with respect to each other; and said thermoplastic matrix reinforced with said fiber combination having at least a 10% greater wear resistance, and a 10% greater weld line strength retention and no greater than 10% increase in flexural modulus than the corresponding wear resistance and weld line strength retention and flexural modulus respectively, of a thermoplastic matrix reinforced with one of carbon fibers, ceramic fibers and glass fibers, when compared at a same total fiber weight % loading in said thermoplastic matrix, and said reinforced plastic composition having a weld line strength of at least 75% of a weld line strength of said thermoplastic matrix.

21. An injection molded article, as set forth in claim 20, wherein said fiber combination is a mixture of carbon fibers and ceramic fibers, said carbon and ceramic fibers being present in a weight ratio in the range of about 1.5:2.5 to about 2.5:1.5 of carbon fibers to ceramic fibers.

22. An injection molded article, as set forth in claim 20, wherein said carbon fibers have a length in the range of about 30 μm to about 300 μm, a diameter in the range of about 5 μm to about 20 μm, and a length to diameter ratio in the range of about 10 to about 30, said ceramic fibers have a length in the range of about 50 μm to about 250 μm, a diameter in the range of about 10 μm to about 40 μm, and a length to diameter ratio in the range of about 3 to about 10, and said glass fibers have a length in the range of about 500 μm to about 2500 μm, a diameter in the range of about 50 μm to about 200 μm, and a length to diameter ratio in the range of about 10 to about 20.

* * * * *